C. A. Johnson.
Culinary Vessel.
Nº 79,574. Patented Jul. 7, 1868.
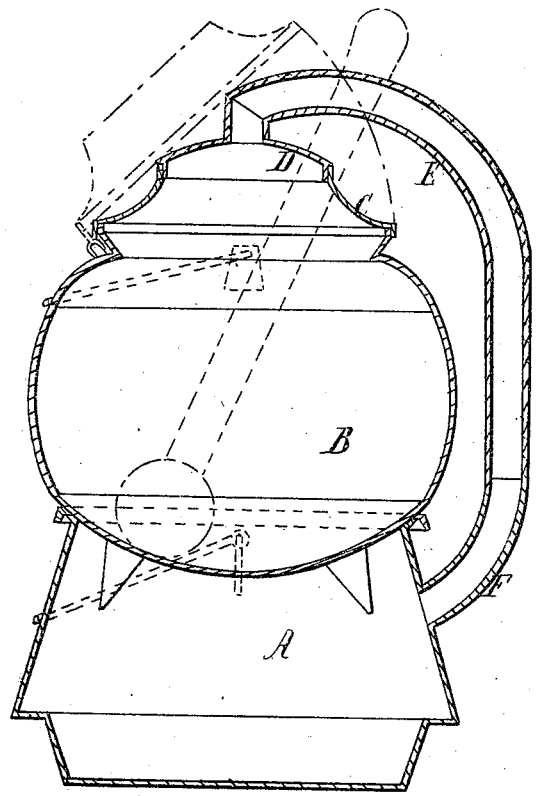
Witnesses
A. A. Yeatman
V. D. Stockbridge
Inventor.
C. A. Johnson.
Alexander & Mason
Attys

United States Patent Office.

C. A. JOHNSON, OF DES MOINES, IOWA.

*Letters Patent No. 79,574, dated July 7, 1868.*

IMPROVEMENT IN CULINARY VESSELS.

*The Schedule referred to in these Letters Patent and making part of the same.*

TO ALL WHOM IT MAY CONCERN:

Be it known that I, C. A. JOHNSON, of Des Moines, in the county of Polk, and in the State of Iowa, have invented certain new and useful Improvements in Combined Apparatus for Steaming and Mashing Potatoes and other Vegetables, and keeping them warm; and do hereby declare that the following is a full, clear, and exact description thereof, reference being had to the accompanying drawings, and to the letters of reference marked thereon.

The nature of my invention consists in the construction and arrangements of two pots, one fitting into the other, and connected by means of a spout from the lower pot, and pipe through the cover of the upper pot, so that the steam may be conducted from the lower pot to the top of the vegetables or other article in the upper.

To enable others skilled in the art to make and use my invention, I will now proceed to describe its construction and operation.

In the annexed drawings, making part of this specification, A and B represent two cast-metal pots, which are made, in general construction, very similar to those belonging to the common cooking-stove furniture, having rims around their bottoms, and being of such size as to fit the holes of the stove for which they are designed. The upper pot, B, is also constructed so that its bottom will fit snugly and almost steam-tight upon the top of pot A. The bottom of pot B is made almost globe-shaped.

The pot B is provided with two covers, one, C, which is hinged, and provided with a hole in its top, and the other, D, which fits snugly in the hole of cover C, and which is provided with a steam-pipe, E. This pipe E turns downward, and connects with a spout, F, of the lower pot, A. Water being placed in the lower pot, and vegetables in the upper, the spout F and pipe E serve to convey the steam from the lower into the upper, for the purpose of cooking the vegetables.

The cover D and pipe E are only used while the process of steaming food is going on. As soon as the vegetables have been sufficiently steamed, the cover D is removed, and a vegetable-masher inserted through the opening in cover C. The opening in this cover, being comparatively small, enables the operator to use the masher with great facility, giving it the while a horizontal rotary motion, as well as an up-and-down motion, for mashing the vegetables.

Having thus fully described my invention, what I claim as new, and desire to secure by Letters Patent, is—

The pots A and B, fitted together, and connected by means of the spout F, pipe E, and covers C and D, when used substantially as and for the purpose set forth.

In testimony that I claim the foregoing, I have hereunto set my hand, this 30th day of December, 1867.

C. A. JOHNSON.

Witnesses:
J. M. GRIFFITHS,
E. M. WRIGHT.